3,189,043
ZERO GOVERNOR

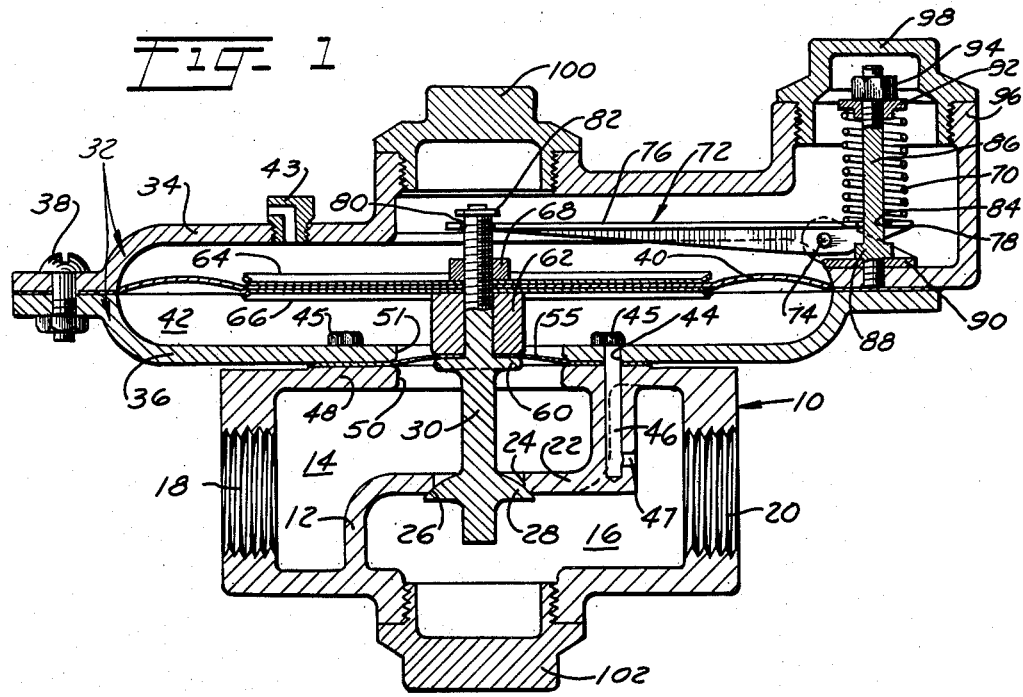
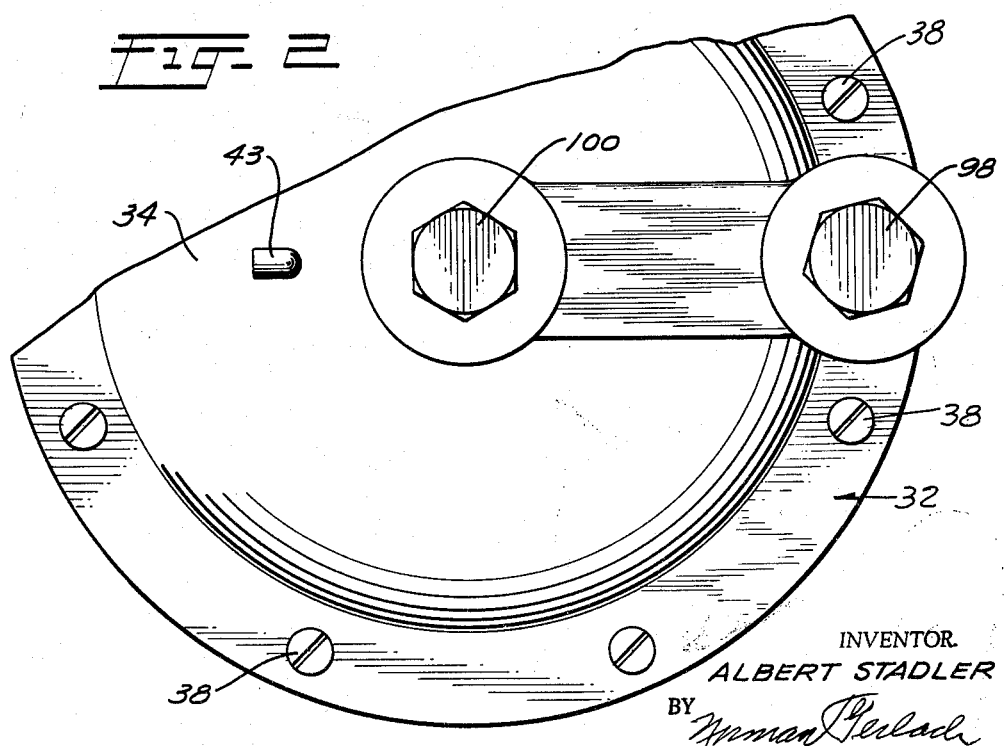

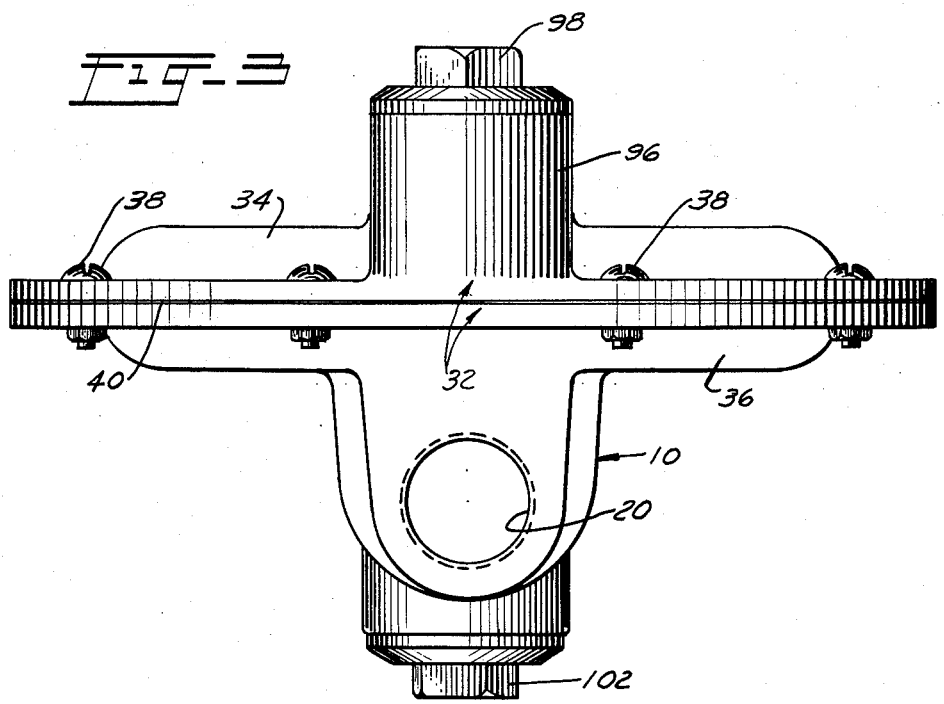
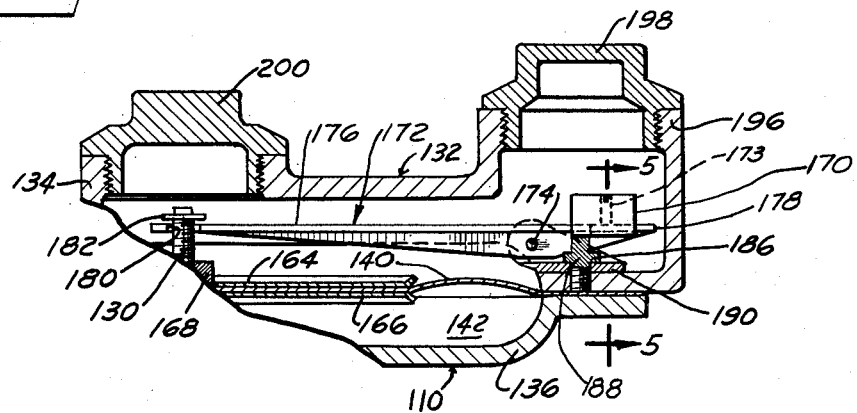
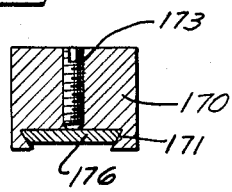
INVENTOR.
ALBERT STADLER
BY
ATTORNEY

Albert Stadler, Rockford, Ill., assignor to Eclipse Fuel Engineering Co., Rockford, Ill., a corporation of Illinois
Filed Jan. 30, 1963, Ser. No. 255,055
3 Claims. (Cl. 137—494)

The present invention relates generally to valve constructions and more particularly to a valve construction of the pressure regulating type wherein a fluid entering the valve chamber under pressure may be delivered from the chamber at a predetermined constant pressure. Still more specifically, the invention is concerned with a pressure regulator valve of the type which is commonly referred to as a "zero governor" and involves the use of a diaphragm, and is widely used to supply gas to proportional mixing equipment wherein gas and air are blended for subsequent delivery to a burner for example, and it is necessary that one or both fluids, namely, gas and air, be received at atmospheric or other relatively low pressure.

For reasons that are well known, it is commonly the practice to maintain the valve stem of a diaphragm-controlled pressure regulating valve of the aforementioned type in a vertical position and thus the weight of the valve stem, the valve proper, the medial regions of the diaphragm, and the various parts that are associated with the diaphragm such, for example, as the diaphragm stiffening plates, the spacer block, the clamping nut and other diaphragm accessories, present normally unbalanced forces which, unless effectively balanced by mechanical means, preclude the attainment of accurate zero conditions under varying inlet pressures and varying discharge capacities.

Invariably, in connection with a pressure regulator of the zero governor type, a spring arrangement is employed for supporting the unbalanced weight of the various unbalanced valve-operating parts. However, because of the fact that conventional tension and compression springs present a definite gradient reaction force to increasing spring displacements with the force increasing sharply as the spring is extended or compressed, as the case may be, unbalanced increments of force are introduced and applied to the diaphragm. Heretofore, in order to reduce these unbalanced forces to tolerable limits, it has been the practice to support the weight of the valve, the diaphragm and their associated parts by means of a spring which is sufficiently long that in the limited range of movements of the valve and diaphragm a fairly constant tension or compression is exerted upon the moving supported parts. This has necessitated the use of an extremely long spring housing which extends upwardly above or downwardly below the valve casing an appreciable distance and greatly adds to the head room of the valve as a whole. Exemplary of an elongated spring and its tubular housing in connection with a zero governor is United States Patent No. 1,950,121, granted on March 6, 1934 and entitled "Governor."

The present invention is designed to overcome the above-noted size limitation that is attendant upon the construction of a conventional zero governor or similar pressure regulating valve assembly and, toward this end, the invention in one contemplated form thereof provides an effective spring balancing means for accurately neutralizing the weight of the valve stem and its associated parts, such means utilizing a motion-diminishing leverage system between the valve stem and the spring so that large increments of valve displacement are translated into small increments of spring displacement. By such an arrangement, an appreciable shorter spring than has heretofore been possible may be used, thereby commensurately reducing the length of the spring housing and, consequently, the overall size of the zero governor as a whole. In another form thereof, the invention contemplates the use of a weight, the gravitational force offered by such weight being effectively applied through a leverage system to the valve stem for counterbalancing purposes. By thus eliminating the use of a spring for counterbalancing purposes, the influence of spring-displacement reaction forces are no longer present and the diaphragm, being freed from the effects of such forces, may operate solely under the influence of opposed and unmodified pneumatic forces in its intended manner.

Numerous advantages accrue from the use of such a balancing means for relieving the diaphragm of unwanted reaction forces and principal among these are an increase in capacity over a conventional or present-day zero governor of corresponding size, and the corollary advantage that a decrease in size, simplicity in design and a material reduction in manufacturing cost are made possible.

Increase in capacity as outlined above is made possible inasmuch as with a conventional zero governor of the type under consideration the effective displacement of the valve proper, i.e., displacement of the valve proper from its seat, must necessarily be limited to a relatively short stroke otherwise the previously mentioned reaction force that is offered by the spring to wide displacements adversely affect the pneumatic balancing forces that act on the diaphragm and destroy the sensitivity of the valve structure as a whole. In the present instance, where a spring is employed for counterbalancing purposes, the leverage system which is effective between the diaphragm and the spring allows a wide displacement of the valve from its seat, this wide displacement being translated to the spring in greatly diminished form so that the spring may operate in a portion of its rate curve where spring displacements are not affected appreciably by mounting reaction forces. Where the use of a weight is employed for counterbalancing purposes according to the present invention, the leverage system similarly translates wide valve and diaphragm displacements into small weight displacements which are truly constant in their effect upon the diaphragm so that the valve proper may be moved between its fully open and its fully closed positions with the unbalanced weight of the moving parts of the valve structure being precisely balanced in any given intermediate position of the valve.

The provision of a zero governor which is simple in its construction and, therefore, may be manufactured at a low cost; one which is rugged and durable and, therefore, will withstand rough usage; one which is comprised of a relatively small number of moving parts and, therefore, is unlikely to get out of order; one which is capable of ease of assembly and dismantling for purposes of inspection, replacement of parts or repair; one which is extremely sensitive to pressure differentials and is rapid in its response; and one which otherwise is well adapted to perform the services required of it, are further desirable features which have been borne in mind in the production and development of the present invention.

Numerous other objects and advantages of the invention, not at this time enumerated, will become apparent from a consideration of the following detailed description.

In the accompanying two sheets of drawings forming a part of this specification, two illustrative embodiments of the invention have been shown.

In these drawings:

FIG. 1 is a sectional view taken substantially centrally and vertically through a zero governor involving the principles of the present invention;

FIG. 2 is a fragmentary plan view of the zero governor of FIG. 1;

FIG. 3 is a side elevational view of the zero governor of FIG. 1;

FIG. 4 is a fragmentary view similar to FIG. 1 but showing a modified form of the invention; and FIG. 5 is a sectional view on the line 5—5 of FIG. 4.

Referring now to the drawings in detail and in particular to FIGS. 1 to 3 inclusive, wherein one embodiment of the invention employing a spring balancing means for the valve and its associated diaphragm has been shown, the zero governor involves in its general organization a valve casing 10 which is preferably in the form of an integral one-piece casting and forms an internal valve chamber. The latter is divided by a partition wall 12 into an inlet chamber 14 and an outlet chamber 16. The inlet chamber 14 is provided with a screw threaded inlet port 18 which is adapted to be operatively connected by a pipe (not shown) to a source of gaseous fuel or other gaseous medium undergoing pressure regulation, while the outlet chamber 16 is provided with a screw threaded outlet port 20 which is adapted to be operatively connected by a pipe (also not shown) to a mixing device, burner or other apparatus at which it is desired to maintain a condition of atmospheric or other low pressure. The partition wall 12 is formed with a horizontal portion 22 having a valve opening 24 therethrough. A valve seat 26 surrounds the opening 24 and is designed for cooperation with a valve proper 28 on the lower end of a vertically extending valve stem 30.

The zero governor further includes a two-part diaphragm casing 32 and it comprises an upper part 34 and a lower part 36, the two parts being secured together by nut and bolt assemblies 38 and having a horizontal diaphragm 40 interposed therebetween. The casing 32 provides an internal diaphragm chamber 42 across which the diaphragm 40 extends. The upper part 34 of the casing 32 is formed with a small bleeder port 43 therethrough. Such port establishes communication between the chamber 42 and the atmosphere. An annular series of attachment screws 45 serves to affix the diaphragm casing to the valve casing 10.

The lower part 36 of the diaphragm casing is formed with a small opening 44 in the central portion thereof. The opening is in register with the upper end of a vertical passage 46 in the partition wall 12 of the valve casing 10. The lower end of the passage 46 is provided with a short lateral leg 47 which communicates with the outlet chamber 16. The passage 46 and the leg 47 establish communication between the diaphragm chamber 42 and the outlet chamber 16. The top wall 48 of the valve casing 10 has formed therein a central opening 50 through which the valve stem 30 projects upwardly, and this opening 50 is in register with a similar opening 51 in the central portion of the lower part 36 of the diaphragm casing. The top wall 48 of the valve casing 10 underlies the lower diaphragm casing part 36. A sealing diaphragm 55 has its peripheral regions clamped between the top wall 48 and the lower casing part 36. It extends across the aligned or registering openings 50 and 51 and has its central portion fixedly secured to the valve stem 30 in a manner that will be made clear presently.

The medial region of the valve stem 30 is provided with a radial seating flange 60. Such flange constitutes a seat for the central region of the sealing diaphragm 55 which it underlies. A combined clamping ring and spacing collar 62 surrounds the valve stem 30, overlies the diaphragm 55, and serves to clamp the diaphragm against the seating flange 60. Said combined clamping ring and spacing collar is effectively interposed between the two diaphragms 55 and 40 and closely underlies the main diaphragm 40. Two diaphragm plates 64 and 66 are disposed on opposite sides of the diaphragm 40 and exert a clamping effect on the medial region of said diaphragm under the influence of a clamping nut 68 which is mounted on the threaded upper end of the valve stem 30. The clamping nut also serves to urge the clamping ring and spacing collar 62 into clamping engagement with the diaphragm 55.

The general arrangement of parts thus far described is more or less conventional and no claim is made to any novelty in it, the novelty of the present invention residing rather in the improved and effective means whereby the otherwise unbalanced weight of the valve stem 30 and its associated parts including the diaphragms 40 and 55 may be accurately counterbalanced throughout all the increments of motion of which the same are capable. Such means will subsequently be more fully described and claimed.

Briefly, the counterbalancing means of the present invention includes a relatively short and sturdy spring 70 which has a relatively high spring rate as compared to the springs which are employed with conventional spring-biased counterbalancing mechanisms for zero governors. Said spring 70 operates upon one end of a horizontally disposed lever 72 which is mounted on a horizontal fulcrum pin 74 that is suitably supported in the upper casing part 34. The other end of the lever 72 operates upwardly upon the valve stem 30 to counterbalance the weight thereof, as well as the weight of its associated parts including the valve proper 28, the combined clamping ring and spacing collar 62, the nut 68 and the unsupported regions of the two diaphragms 40 and 55.

More specifically, the lever 72 operates as a lever of the first class in which the counteracting forces are effective on opposite sides of the fulcrum point. The lever 72 includes a long lever arm 76 and a short lever arm 78. The distal end of the long lever arm 76 is formed with an opening 80 therethrough and the extreme upper end region of the valve stem 30 projects loosely through this opening. A cotter pin 82 or similar reaction device at the upper end of the valve stem serves to assimilate the upward thrust which is offered by the distal end of the lever arm 76 by reason of the action of the spring 70. A similar opening 84 is formed in the distal end region of the short lever arm 78 and receives loosely therethrough a spring-supporting post 86. The lower end of the post 86 is provided with an external screw thread and fits in a screw threaded socket of the upper casing part 34. A radial flange 88 on the lower end of the post 86 serves to clamp a fulcrum pin-supporting bracket 90 in position within the upper casing part 34.

The spring 70 surrounds the post 86 and bears at its lower end downwardly against the distal end region of the short lever arm 78 and at its upper end against a seating collar 92 which, in turn, bears against an adjusting nut 94 on the screw threaded upper end of the post 86. The upper casing part 34 is formed with a short integral upwardly extending tubular spring housing section 96 in the peripheral region thereof in order to accommodate the spring 70 and its associated parts. A closure cap 98 fits removably in the open upper end of the tubular housing section 96. It is retained in place by interengaging screw threads and when removed affords access to the adjusting nut 94.

A screw type closure cap 100 like the closure cap 98 fits removably in a circular opening in the central portion or region of the upper casing part 34 and when removed affords access to the upper region of the valve stem 30 for cleaning or adjusting purposes. A third screw type closure cap 102 fits in a circular opening in the central portion of the bottom wall of the valve casing 10 and when removed affords access to the valve proper 28 and its seat 26.

In the operation of the above-described zero governor, the pressure of gas admitted to the inlet chamber 14 is equalized against the diaphragm 55 and the exposed area of the valve proper 28 due to the fact that the parts are so designed that the effective areas presented thereby are substantially equal when the valve is seated. The spring-adjusting nut 94 is initially adjusted so that the upward thrust exerted by the distal end of the lever arm 76 on the valve stem 30 is precisely equal to the downward gravitational force exerted upon the valve stem and its associated parts such as the two diaphragms, the spacer collar 62, etc. Therefore, with equalized pressure acting upon the valve stem in both vertical directions, all of the moving parts of the mechanism will be in a state of equilibrium and the valve proper 28 will seat lightly on the valve seat 26.

When gas is aspirated or otherwise drawn from the outlet chamber 16 through the outlet port 20, the static pressure in the chamber 16 will drop and this drop in pressure is reflected through the L-shaped passage 46 to the interior of the diaphragm chamber 42 on the underneath side of the diaphragm 40. The overbearing pressure which is on the upper side of the diaphragm and within the chamber 42 and is bled to atmosphere through the port 43 causes the diaphragm 40 to be flexed downwardly, thus moving the valve proper 28 from its seat 26 and allowing a limited flow of gas from the inlet chamber 14 to the outlet chamber 16 through the valve opening 24. As long as the demand is small so that the velocity of the gas moving through the outlet chamber 16 is small, the valve proper 28 opens only to a slight extent and the valve continues to operate substantially in accordance with static variations in the outlet chamber, the entrance of gas into the inlet chamber 14 serving to supply restoring pressure sufficient to balance the diaphragm.

If the demand for gas at the outlet side of the governor increases, a more rapid opening of the valve proper 28 will be required and this rapid opening of the valve is effected by reason of the lateral leg 47 of the passage 46 which operating in the manner of a pilot tube reflects first the decrease in pressure in the outlet chamber 16 and subsequently the velocity flow of gas through the chamber 16 and accelerates the decrease in pressure within the diaphragm chamber 42 below the diaphragm. Although the static pressure acting on the upper face of the valve proper 28 is reduced as the valve proper moves farther away from its seat, the effect of this is partially counteracted by impingement of the gas rapidly flowing against the upper face of the valve. The net result of all these phenomena is a comparatively rapid opening of the valve proper 28, this opening being sufficiently rapid as to allow sufficient gas to enter the outlet chamber to build up the pressure therein to a point where the demand is satisfied and a constant gas flow through the governor obtains. At this time, the reflection of such pressure back through the passage 46 to the diaphragm chamber 42 will bring the diaphragm 40 to a state of equilibrium and cause the valve proper 28 to assume a position where the flow of gas through the opening 24 is insufficient to maintain a pressure within the chamber 16 in excess of atmospheric pressure or such other low pressure as may be determined by the setting of the spring-adjusting nut 94.

The above-described operation of the zero governor does not differ materially from the operation of conventional zero governors except insofar as it is regulated by the operation of the spring balancing means including the spring 70 and the first class lever 72. Despite the relatively short length of the spring 70 a full counterbalancing effect on the valve stem and its associated parts without appreciable gradient reaction forces disturbing the pneumatic pressure regulating mechanism takes place. Despite comparatively wide valve displacements, the range of vertical movement of the lower end of the spring 70 is never so great that any appreciable gradient reaction force is reflected through the lever 76 to the valve stem 30. The mechanical advantage which is offered by the lever 72 permits the use of a relatively thicker spring and one which may be made to accurate dimensions without difficulty. Furthermore, despite the higher rate of the spring, extremely sensitive spring adjustments are possible.

Insofar as the form of the invention shown in FIGS. 1 to 3 is concerned, numerous spring and lever combinations are contemplated within the scope of the appended claims. For example, although the spring 70 is a compression spring and exerts a downward thrust on the short lever arm 78, a tension spring which exerts a downward pull upon this lever arm would serve the same purpose. Alternatively, a tension spring which exerts an upward pull upon the medial region of a lever of the second class, or a compression spring which exerts an upward thrust upon such a lever may be effectively employed for valve stem counterbalancing purposes if desired. Irrespective, however, of the class of lever which is employed or of the character of the spring, the essential features of the invention are at all times preserved.

In FIG. 4, a modified form of the invention has been fragmentarily illustrated. In this form of the invention, the use of a counterbalancing spring is dispensed with and in its stead there is substituted a weight 170 for exerting a constant downward thrust upon the short lever arm 178. In this illustrated form of the invention, the valve casing 110 and its associated parts, as well as the diaphragm casing 132, the diaphragm 140 and other related parts remain substantially the same as in the form of the invention illustrated in FIGS. 1 to 3 inclusive. Therefore, in order to avoid needless repetition of description, reference numerals of a higher order have been applied to the corresponding parts as between FIGS. 1 and 4.

In FIG. 4, the fulcrum pin-supporting bracket 190 is held in position within the upper casing part 134 by means of a stud 186 while the post 86, the spring 70, the collar 92 and spring-adjusting nut 94 have been eliminated. Otherwise, the remaining parts of the zero governor assembly remain substantially the same as in the form of the invention shown in FIGS. 1 to 3, inclusive. In order to secure variations in the upward thrust offered by the long lever arm 176 upon the valve stem 130, means are provided for varying the position of the weight 170 along the longitudinal extent of the short lever arm 178 to thus vary its effective moment. Accordingly, the weight 170 has a dovetail connection as indicated in FIG. 5 and is adapted to be secured in any selected position on the short lever arm 178 by means of a clamping set screw 173.

The use of a weight 170 instead of a spring, such as the spring 70 of FIG. 1, possesses at least two advantages over the use of a spring. Firstly, where a weight is concerned, no consideration whatsoever need be given to increased reaction forces which obtain when a spring is compressed or extended beyond the linear portion of its rate curve, a weight exhibiting a constant gravitational reaction force in any elevational position thereof. Secondly, the height of the weight housing 196 may be decreased somewhat under certain circumstances, thus decreasing the overall height of the zero governor as a whole.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. In a zero governor, in combination, a lower valve casing providing an internal valve space, a horizontal wall dividing the space and establishing inlet and outlet chambers respectively, inlet and outlet ports in said casing communicating with said inlet and outlet chambers respectively, there being a valve port in said wall establishing communication between the chambers and providing a valve seat, a valve element underlying and cooperating with said seat and movable at right angles to the wall downwardly away from the seat to an open position and upwardly toward the seat to a closed position, an upper diaphragm casing directly above the lower valve casing and having a movable diaphragm therein subject on one side to the degree of pressure in the outlet chamber, said valve and diaphragm chambers being provided with registering openings therein, a valve stem connecting said valve element and diaphragm whereby the valve element is constrained to follow the deflecting movements of the diaphragm, a sealing diaphragm through which the valve stem projects and extending across said registering openings in sealing relationship, and means for counterbalancing the weight of the diaphragm, valve stem and valve element, said counterbalancing means comprising a first class lever disposed within the diaphragm casing, means carried by said diaphragm casing establishing a fulcrum point for said lever, said lever including a relatively short lever arm and a relatively long lever arm, means establishing a supporting connection between the distal end of the long lever arm and said valve stem, a spring reaction support overlying the distal end of said short lever arm, a compression spring interposed between said reaction support and the distal end of said short arm and serving normally and at all times during operation of the zero governor to apply a downward thrust to the short lever arm and a consequent upward thrust on said valve stem to bias the valve toward its closed position, the moment of force exerted by said compression spring on the distal end of said short arm by said compression spring being precisely equal to the moment of force exerted by said supporting connection on the distal end of said long arm.

2. In a zero governor, the combination set forth in claim 1 and wherein said lever is disposed above and overlies said movable diaphragm.

3. In a zero governor, in combination, a valve casing providing an internal valve space, a horizontal wall dividing the space and establishing inlet and outlet chambers respectively, inlet and outlet ports in said casing communicating with said inlet and outlet chambers respectively, there being a valve port in said wall establishing communication between the chambers and providing a valve seat, a valve element cooperating with said seat and movable at right angles to the wall toward and away from the seat, a diaphragm casing having a movable diaphragm therein subject on one side to the degree of pressure in the outlet chamber, and subject on the other side to atmospheric pressure, a valve stem connecting said valve element and diaphragm whereby the valve element is constrained to follow the deflecting movements of the diaphragm, a lever of the first class disposed within the diaphragm casing and including a relatively long lever arm and a relatively short lever arm, means establishing a supporting connection between the distal end of the long lever arm and said valve stem, said lever being disposed above and overlying the diaphragm, and a weight mounted on the distal end region of said short lever arm and effective at all times during operation of the zero governor to exert a gravitational thrust downwardly against said latter lever arm, the mass of said weight, in any adjusted position thereof, being such that the moment of force exerted thereby on the distal end region of said short arm is precisely equal to the moment of force exerted by said supporting connection on the distal end of said long arm, and means for regulably adjusting the position of said weight longitudinally along said lever arm.

References Cited by the Examiner
UNITED STATES PATENTS

| | | | |
|---|---|---|---|
| 746,755 | 12/03 | Spencer | 137—505.18 |
| 2,247,060 | 6/41 | Levine et al. | 137—495 XR |
| 2,587,375 | 2/52 | Paulsen | 137—484.8 |
| 2,905,193 | 9/59 | Campbell | 137—505.18 |

FOREIGN PATENTS 1,251,968 12/60 France.

M. CARY NELSON, *Primary Examiner.*

MARTIN P. SCHWADRON, *Examiner.*